US008751583B2

(12) United States Patent
Solberg et al.

(10) Patent No.: US 8,751,583 B2
(45) Date of Patent: Jun. 10, 2014

(54) SYSTEM AND METHOD FOR PROVIDING BUSINESS CONTINUITY THROUGH SECURE E-MAIL

(75) Inventors: Helge Solberg, Boca Raton, FL (US); Thomas John Elowson, Brandenton, FL (US); Raymond Francis Leitz, Treasure Island, FL (US); Russell Scott Naples, Boca Raton, FL (US)

(73) Assignee: AcXess Inc., Boca Raton, FL (US)

( * ) Notice: Subject to any disclaimer, the term of this patent is extended or adjusted under 35 U.S.C. 154(b) by 937 days.

(21) Appl. No.: 11/703,506

(22) Filed: Feb. 7, 2007

(65) Prior Publication Data

US 2008/0189372 A1    Aug. 7, 2008

(51) Int. Cl.
*G06F 15/16* (2006.01)
*G06F 15/173* (2006.01)

(52) U.S. Cl.
USPC .......................................... 709/206; 709/223

(58) Field of Classification Search
USPC ................... 709/206, 223, 225, 238; 726/11
See application file for complete search history.

(56) References Cited

U.S. PATENT DOCUMENTS

| 6,034,963 | A | 3/2000 | Minami et al. |
| 6,101,320 | A | 8/2000 | Schuetze et al. |
| 6,182,224 | B1 | 1/2001 | Phillips et al. |
| 6,484,257 | B1 | 11/2002 | Ellis et al. |
| 6,513,061 | B1 | 1/2003 | Ebata et al. |
| 6,700,967 | B2 | 3/2004 | Kleinöder et al. |
| 6,721,784 | B1 | 4/2004 | Leonard et al. |
| 6,751,677 | B1 | 6/2004 | Ilnicki et al. |
| 6,757,731 | B1 | 6/2004 | Barnes et al. |
| 6,760,752 | B1 * | 7/2004 | Liu et al. ........................ 709/206 |
| 6,772,413 | B2 | 8/2004 | Kuznetsov |
| 7,054,264 | B2 | 5/2006 | Mor |
| 7,072,933 | B1 | 7/2006 | Lamb et al. |
| 7,080,161 | B2 | 7/2006 | Leddy et al. |
| 7,085,286 | B2 | 8/2006 | Dias et al. |
| 7,106,722 | B1 | 9/2006 | Kuster et al. |
| 7,536,405 | B2 * | 5/2009 | Tschiegg et al. .............. 707/102 |
| 2001/0053214 | A1 | 12/2001 | Kleinoder et al. |
| 2001/0056504 | A1 | 12/2001 | Kuznetsov |
| 2002/0112076 | A1 | 8/2002 | Rueda et al. |
| 2002/0174034 | A1 | 11/2002 | Au et al. |
| 2002/0184393 | A1 | 12/2002 | Leddy et al. |
| 2003/0002526 | A1 | 1/2003 | Dias et al. |
| 2003/0021226 | A1 | 1/2003 | Mor |
| 2004/0153713 | A1 * | 8/2004 | Aboel-Nil et al. ................. 714/4 |
| 2005/0097177 | A1 * | 5/2005 | McUmber et al. ............ 709/206 |
| 2005/0108435 | A1 * | 5/2005 | Nowacki et al. .............. 709/246 |
| 2005/0198173 | A1 * | 9/2005 | Evans ........................... 709/206 |
| 2006/0112166 | A1 * | 5/2006 | Pettigrew et al. ............. 709/206 |
| 2006/0209868 | A1 * | 9/2006 | Callaghan ..................... 370/428 |
| 2007/0005713 | A1 * | 1/2007 | LeVasseur et al. ............ 709/206 |
| 2008/0208605 | A1 * | 8/2008 | Sinha et al. ....................... 705/1 |
| 2008/0272919 | A1 * | 11/2008 | Newman et al. ........... 340/573.1 |

FOREIGN PATENT DOCUMENTS

EP    1 509 033 A1    2/2005

* cited by examiner

*Primary Examiner* — Aaron Strange
(74) *Attorney, Agent, or Firm* — Krishna Kalidindi

(57) ABSTRACT

A method for processing electronic communications is described. The method includes receiving electronic communications from a plurality of sources and processing the communications for delivery to intended addressees. The processing includes ensuring validity of sender, verifying operation of exchange mailbox corresponding to said addressee and routing the communication along a particular path based on the validation and verification.

12 Claims, 7 Drawing Sheets

SYSTEM AND METHOD FOR PROVIDING BUSINESS CONTINUITY THROUGH SECURE E-MAIL

FIELD OF INVENTION

This invention relates generally to the availability of e-mail services for businesses in times of unexpected disaster. More particularly, this invention relates to a method and apparatus for businesses to outsource to a managed services provider the creation and management of a secured offsite/exchange mailbox storage infrastructure that stores emails for business continuity purposes by acting not only as an archive but also making the information readily accessible.

BACKGROUND

Microsoft® Exchange® is widely used e-mail solution at present. In times of disaster (natural, manmade, etc.), e-mail is considered an extremely critical application required for businesses to maintain continuity and consistent communication with associates, customers and vendors.

At present, there exist multiple approaches for improving not only the availability of an exchange gateway during a disaster but also aimed at maintaining continuity and consistent communication between an entity and its associates, customers and business partners.

The most common approaches/examples include the following:

a. Software solutions have been developed by ISVs that enable Microsoft Exchange mail stores and/or exchange server storage to be replicated to secondary/failover exchange mail stores and/or server(s).

b. Hardware appliances providing highly available instances of Exchange have been created. During replication of Exchange stores from a production appliance to a standby appliance, the appliances can maintain a "clean" instance of Exchange and its mail store(s) by silencing the production instance of Exchange. This significantly reduces the risk of corrupting the mail store(s) for both the production and secondary appliance Exchange instance(s).

c. Storage vendors have established block-level replication between homogeneous storage solutions that are connected to Exchange servers. The storage vendors can control both read and write functions to the drives, for both production and secondary servers. This allows the storage vendor to control when reads and writes are occurring to storage at the disk block level, minimizing risk of low level corruption of data.

As with other database driven applications, Exchange data can be replicated as a whole by software solutions through granular low level data or by block level replication. However, resource contention issues with databases that are actively in use sometimes render low level replication ineffectiveness and can result in corrupted data store copies.

Software replication solutions are based upon the premise of establishing a one-to-one copy from production, to a backup or a failover instance. Establishing a one-to-one relationship of production to backup instance makes it inherently difficult to implement a managed services approach to exchange replication that is both cost effective for smaller businesses and not overly complex.

Hardware based storage replication solutions are tightly coupled to the selected storage vendor. These solutions are possible for large organizations, with sufficient staff and consistently implemented technical solutions/standards, but are costly to implement and maintain over longer time. These solutions are quite beneficial for the hardware vendors, but not to customers, as they result in continued lock-in of the customer through the establishment of a high cost barrier to entry for competitors.

Existing software and hardware replication solutions for Microsoft Exchange include: (Neverfail™) Neverfail for Exchange, (NSI™) Doubletake, (XOSoft™) WanSync for Exchange, (Veritas™) Global Cluster Manager, (Mimosa Systems™) NearPoint, (Cemaphore™) MailShadow and (Azaleos™) OneServer "Exchange Appliance".

Certain other present technologies are discussed. EMC Legato EmailXtender™ provides customers with a solution for archiving emails from Exchange servers to improve production mail store performance and reduced storage costs. A related product from Legato called the EmailXaminer™, provides support for inspection of corporate e-mail to verify policies are being maintained for regulatory compliance purposes.

MailShadow™, created by Cemaphore, replicates locally all MAPI transactions that occur to/from Exchange servers. Then, its proprietary formatting is used to compress the transactions and transmit them to a remote instance of Exchange, where the messages are uncompressed and consolidated into one Exchange data store instance for recovery purposes. This solution results in the consolidation of N server instances down to one instance, on a company's WAN that can be used for disaster recovery purposes.

Azaleos™ has an offering in the form of an appliance type solution called the OneServer Exchange Appliance. Azaleos offers a managed service, called OneStop™, for outsourced 24×7 monitoring and a remote support of OneServer appliances. Azaleos™ also offers a configuration called Full Fidelity Disaster Recovery for Exchange that allows for replication between two OneServer appliances for disaster recovery purposes.

U.S. Pat. No. 7,085,286 to Dias, et al. discloses a method for communication between two different and separate business entities which utilize a different communication protocol.

U.S. Pat. No. 7,072,933 to Lamb, et al., focuses on achieving network access control by using a network address translation protocol. Lamb places a gateway between the LAN/computer and the internet, which allows for content filtering by a technology known as "proxy server" or "application level gateway".

U.S. Pat. No. 7,080,161 to Leddy, et al., describes routing of information, through an Exchange. Ledi focuses on the integration between network architectures and protocols for supporting enhancements in the decision making processes in context of standard routing protocols.

U.S. Pat. No. 7,106,722 to Kuster, et al. discloses a system for address information exchange between media gateways. Kuster focuses on providing for a direct, per call address information exchange, between two distinct IP Media Exchange Gateways.

U.S. Pat. No. 7,054,264 to Mor discloses a communication device for interconnection between two Networks.

U.S. Pat. No. 6,034,963 to Minami, et al. discloses a multiple network protocol encoder/decoder and data processor.

U.S. Pat. No. 6,751,677 to Ilnicki, et al. discloses a method and apparatus for allowing a secure and transparent communication between a user device and servers of a data access network system, via a firewall and a gateway.

U.S. Pat. No. 6,700,967 to Kleinoder, et al. discloses a presence information method and system.

U.S. Pat. No. 6,101,320 to Schuetze, et al. discloses an electronic mail communication method and system for exchanging e-mail between organizations having dissimilar electronic mail systems.

EP Patent Application No. 1 509 033 A1 to Webel discloses methods and devices for connecting IP terminations and PSTN terminations.

The prior art cited above has bulky designs and time consuming methods. These have a general, mandatory requirement for the installation of a third party software or require the usage of proprietary storage hardware, on the exchange server for the purposes of replication of mail and communication of message storage.

Another notable drawback in the prior art is that the installation of a new hardware or software has an impact on the operation of the existing exchange solution which is available to an organization.

Furthermore, the prior art does not address the issues of providing an effective, simple and easy to operate exchange solution or, providing storage, chronological archiving and/or retrieval of e-mail messages. All these form an integral parameter for a secured offsite e-mail storage system for use in the event of any disaster.

Accordingly, there exists a need for providing a secure e-mail system for business continuity in the event of a disaster wherein the system is equipped to not only serve as an archiving source but also to ensure easy and prompt retrieval of archived information.

In view of the foregoing disadvantages inherent in the above-mentioned prior art, the general purpose of the present invention is: to provide an improved combination of convenience and utility, to include all the advantages of the prior art, to overcome the disadvantages/drawbacks of the prior art and to provide a secure e-mail system for businesses which is specific, quicker and efficient.

SUMMARY

The present invention provides an easy to use system and method for e-mail solution systems, providing for business continuity of email services in an event of unexpected disasters, which is simple to use and highly efficient in terms of time consumption, as well as, capable of being customized to an organization's needs and profile.

It is an object of the present invention to create a business continuity solution for e-mail services, primarily focused towards the Microsoft Exchange marketplace.

It is another objective of the present invention, to make available a method for providing business continuity of e-mail services, in the event of an unexpected disaster.

It is a further object of the present invention to offer to customers an "always available" offsite-managed Microsoft Exchange solution, and thus, having no impact on their existing Microsoft Exchange solution and its day to day operation.

It is yet another object of the present invention to provide the solution as a multi-tenancy hosted/managed services solution, such that its customers do not need implement any incremental obligation to manage as an addition in infrastructure within their enterprises. This means no additional software or hardware should be required to be implemented by customers in order to leverage the invention.

It is yet further object of the present invention to provide for a solution that is secure, and only allows customers to have access to their e-mails/messages/mailboxes.

It is yet another object of the present invention that the solution will allow a customer technical resource, to use tools provided as part of the invention, to export messages to a file that can be downloaded, with the intent of restoring the messages from the download, back to the customer's production Exchange environment.

It is yet another object of the present invention to offer additional regulatory compliance services, including archiving storage for clients, reviewing for potential information leaks through repeated patterns of sending document attachments to personal e-mail addresses (or other external e-mail destinations), and, to look for improper usage of e-mail based upon customer's IT policies, etc.

BRIEF DESCRIPTION OF DRAWINGS

For a better understanding of the nature of the present invention, reference should be made to the detailed description taken in conjunction with the accompanying drawings in which.

DETAILED DESCRIPTION

Exemplary embodiments described herein for illustrative purposes are subject to numerous variations. It is understood that various omissions, substitutions or equivalents are contemplated as circumstances may suggest or render expedient.

Figure 1:
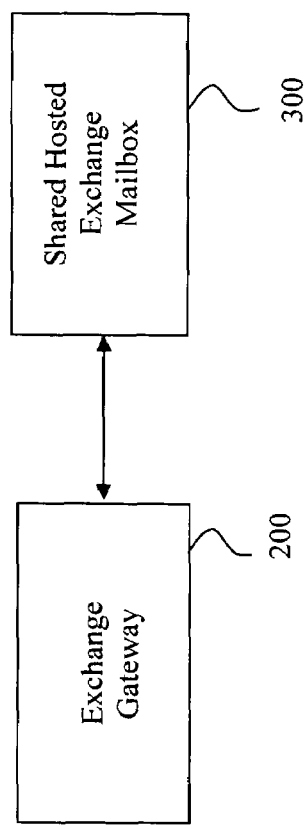
FIG. 1 illustrates an exemplary secure e-mail system.

FIG. 1 illustrates an exemplary secure e-mail system 10. E-mail system 10 includes an Exchange® gateway 200 and a shared hosted Exchange mailbox 300. As is known in the art, an Exchange gateway and mailbox are specific types of an email server gateway and mailbox respectively. Exchange is a registered trademark of Microsoft® Corporation. Communication takes place between the Exchange gateway 200 and shared/hosted Exchange mailbox 300. The Shared/hosted Exchange mailbox duplicates the functionality of a customer's own Exchange mailbox. Some or all of a customer's personnel may be permitted direct access to the shared/hosted Exchange mailbox in the event of a disaster or other business interruption that leads to the unavailability of the customer's own Exchange mail server or associated Exchange mailbox.

Another circumstance when the shared/hosted Exchange mailbox may come into use is when a customer initiates a request for archived and/or queued e-mails—this could be responsive to a regulatory compliance request or when the customer's own Exchange server or mailbox has to be rebuilt due to data corruption or other software errors. E-mail data that is produced in response to such customer-initiated requests can be provided through direct access to the shared/hosted Exchange mailbox or on physical media such as CDs and DVDs. The-mail system is secure since in its routine mode of operation, it receives a duplicate copy of some or all internal and/or external e-mails from the customer's Exchange server/mailbox over a secure link.

Figure 2:
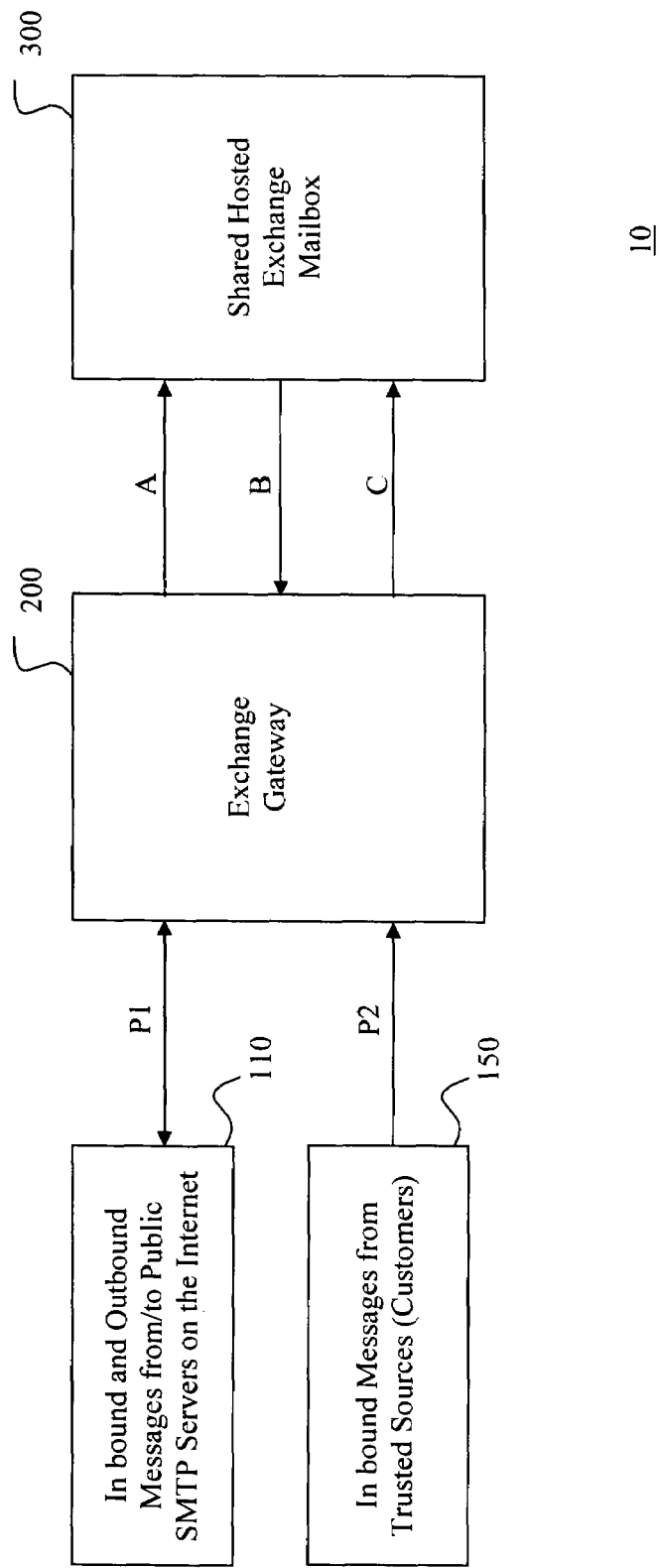
FIG. 2 illustrates an exemplary information exchange in the e-mail system of FIG. 1.

FIG. 2 illustrates information exchange in accordance with the secure e-mail system. Exchange gateway 200 processes inbound and outbound messages from/to public SMTP (simple mail transfer protocol) servers 110 on a public network such as the internet via the bidirectional path P1 and from trusted sources 150 (typically, from customers of the shared/hosted mailbox services0 via the unidirectional path P2. Exchange gateway 200 also communicates with shared hosted Exchange mailbox 300 as described in further detail herein below.

As noted earlier, there are two modes of operation of the system and method of the present invention. In the first mode of operation, which is referred to herein as the routine mode of operation, a client subscribes to the shared/hosted Exchange mailbox service and specifies the queueing and archiving criteria to be used for various aspects of the business continuity e-mail services of the present invention (such as e-mail backup, disaster recovery, server maintenance, downtime, archival purposes etc.). Simultaneously, the customer programs his own Exchange server/mailbox to forward some or all of internal and/or external e-mail traffic (gated, if desired, by appropriate selection criteria, such as seniority, subject matter, corporate position etc.) to the shared/hosted Exchange mailbox of the present invention over a secure connection P2.

In the second mode of operation, which is referred to herein as the Business Continuity ("BC") mode of operation, the Internet Service Provider for the customer's e-mail services is requested to reroute all incoming and outgoing e-mail traffic for a specific customer from the customer's Exchange server/mailbox to the shared/hosted Exchange Mailbox. This mode of operation is typically invoked in situations when the customer's e-mail server/mailbox is unavailable due to either a disaster or other business continuity event or a hardware/software problem with the customer's Exchange server/mailbox. The rerouting of all of such customer's inbound and outbound e-mail traffic can also be effectuated by updating the appropriate routing tables and/or domain name records of the Internet. In this mode of operation, all incoming and outgoing e-mail pertaining to one or more specific customers are directed to the shared/hosted Exchange gateway 300 through the inbound and outbound public SMTP servers 110 on the Internet.

Figure 3:
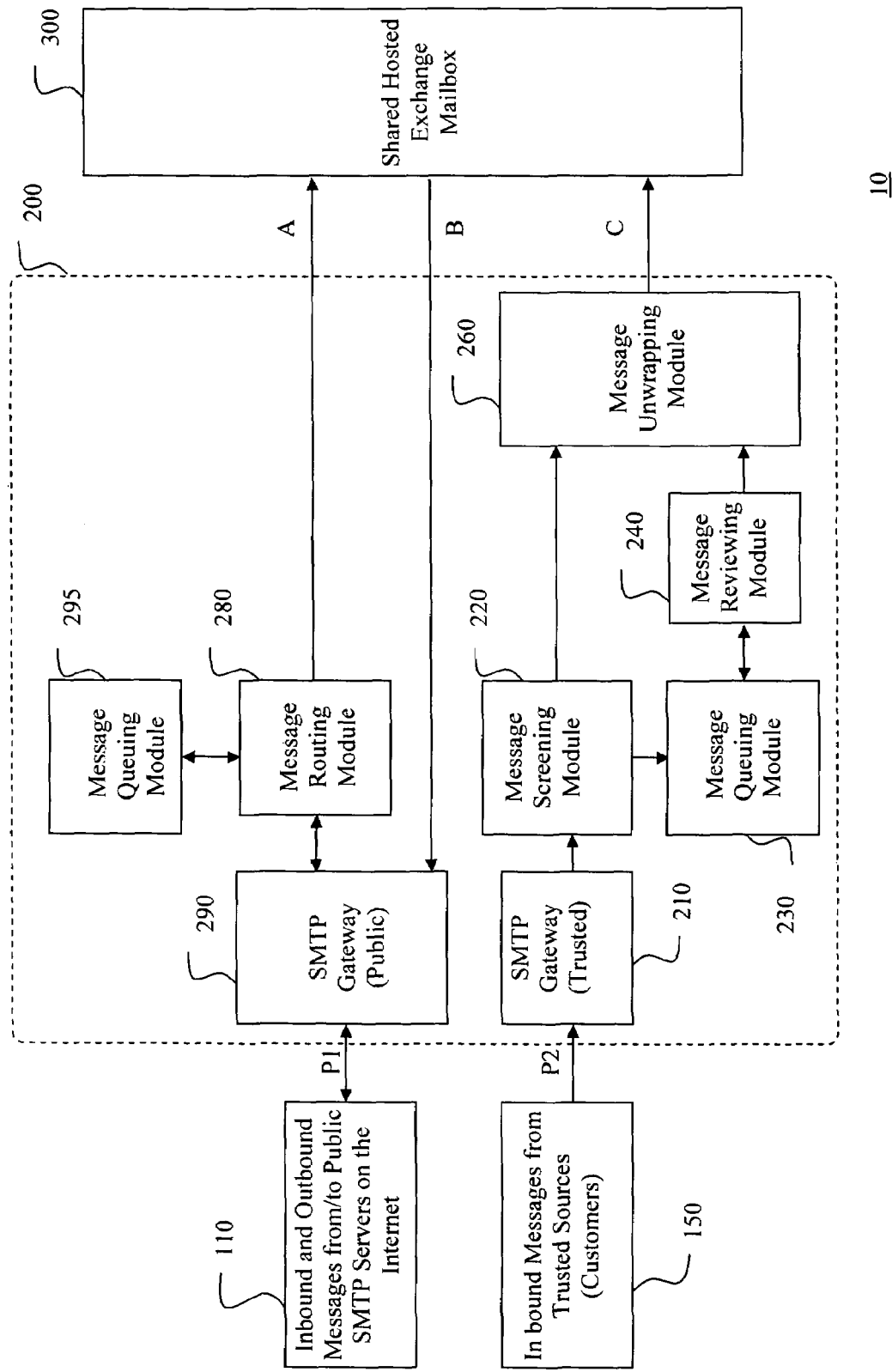
FIG. 3 illustrates components of an exemplary exchange gateway of FIGS. 1 and 2.

FIG. 3 illustrates Exchange gateway 200. Exchange gateway 200 includes SMTP gateways 290 and 210. SMTP gateway 290 communicates bidirectionally with external entities such as public SMTP server 110 as well as shared/hosted Exchange mailbox 300. Exchange gateway 200 also includes a message routing module 280 that communicates with SMTP server 290 and a message queuing module 295. The message routing module 280 is described in further detail with reference to FIG. 4.

SMTP gateway 210 receives inbound messages from trusted sources 150. A trusted source may be accessible over a private network. A trusted source may also be accessible over a public network via a secure connection or via a virtual private network (VPN). A message screening module 220 communicates with SMTP gateway 210, message queuing module 230 and message unwrapping module 260. The message screening module 220 is described in further detail with reference to FIG. 5. The Exchange gateway 200 also includes a message reviewing module 240 that communicates with message queuing module 230 and message unwrapping module 260. The message reviewing module 240 is described in further detail with reference to FIG. 6. The message unwrapping module 260 also communicates with shared hosted exchange 300. The message unwrapping module 260 is described in further detail with reference to FIG. 7.

Figure 4:
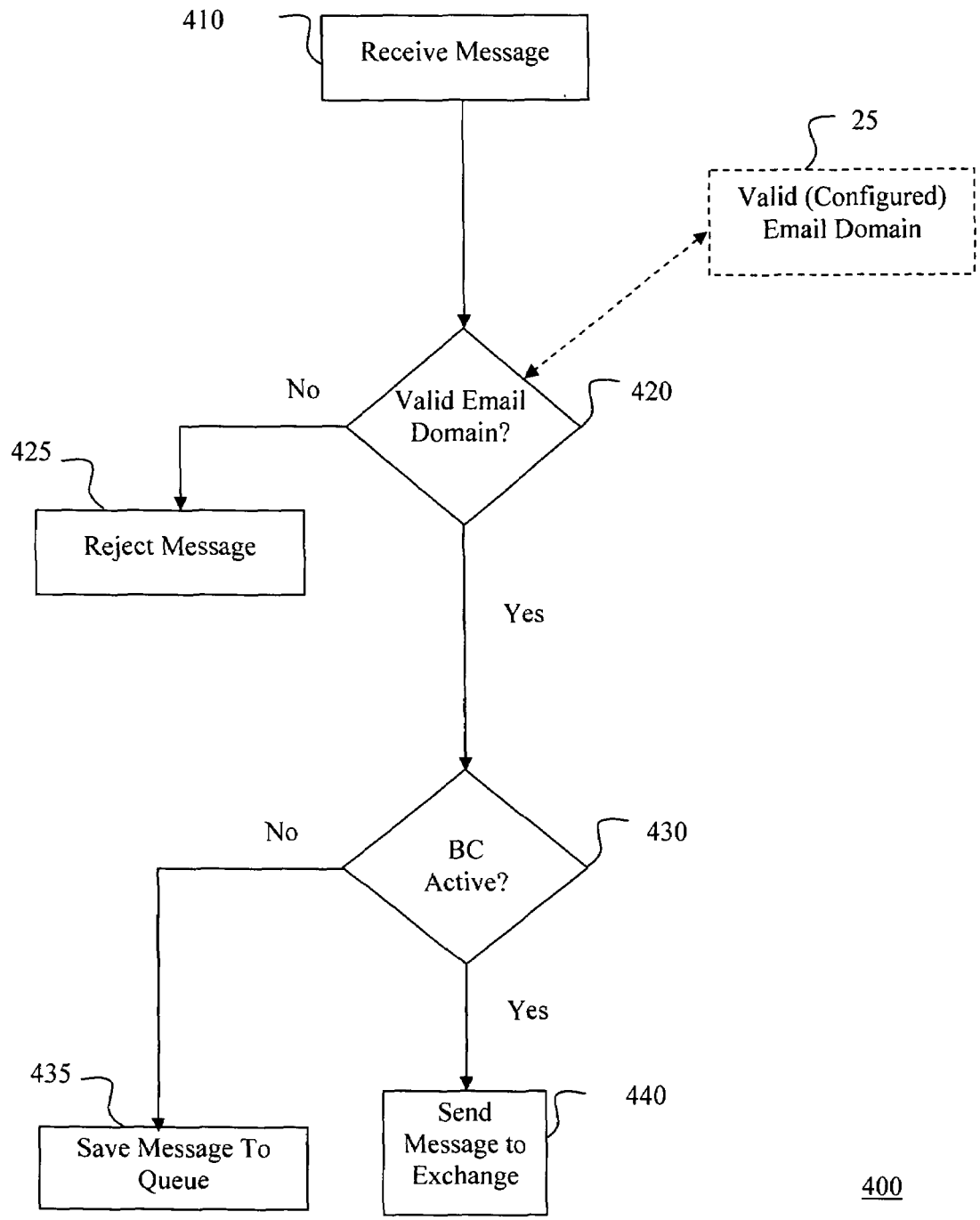
FIG. 4 illustrates a message routing process according to exemplary embodiments.

FIG. 4 illustrates process 400 corresponding to the functioning of message routing module 280 of FIG. 3. Messages from public SMTP gateway 290 (of FIG. 3) is received at 410. The domain of the message is validated at 420. For example, validation may take place by comparing the domain with list of valid domains pre-stored in database 25. If the domain is not valid, the message is rejected at 425. If the domain is found to be valid, status of the customer's Exchange server/mailbox is next determined at 430. If the customer's Exchange server/mailbox is down (i.e. the Business Continuity status has been activated), the message is sent to the shared/hosted Exchange mailbox at 440. If the customer's Exchange server/mailbox is up/functioning/operating (i.e. BC has not been activated), then the message is saved to a message queue (message queuing module 295 of FIG. 3) at 435.

Figure 5:
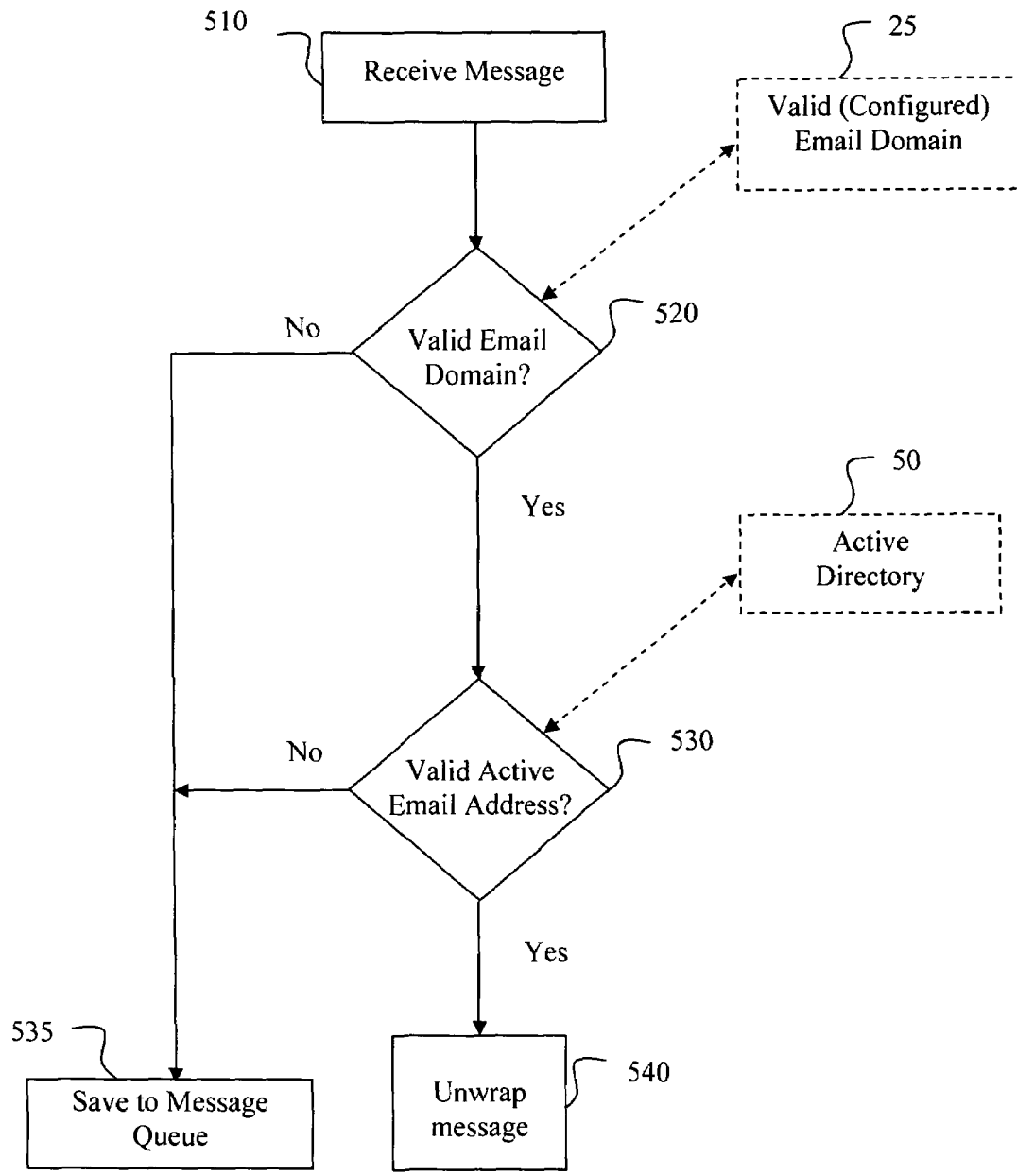
FIG. 5 illustrates a message screening process according to exemplary embodiments.

FIG. 5 illustrates process 500 corresponding to the functioning of message screening module 220 of FIG. 3. Inbound Messages from trusted SMTP gateway 210 (FIG. 3) are received at 510. The domain of the message (i.e. confirmation that the forwarding sender is a current customer) is validated at 520. Validation may take place, for example, by comparing the originating domain of a message with list of valid domains pre-stored in database 25. If the domain is not found to be valid, message are saved to message queuing module 230 at 535. If the domain is found to be valid, then the e-mail address (of the recipient) is next validated at 530. Validation may take place, for example, by comparing the e-mail address with list of valid (existing) e-mail addresses pre-stored in database 50. A valid e-mail address in this context may refer to a list of addresses that need access during the emergency. That is, not everyone in an organization may be provided access to their messages during a crisis. Managers or certain employees/individuals may be pre-designated as requiring access during an emergency. If the e-mail address is not valid, then the messages are saved to queuing module 230 at 535. If the e-mail address is found to be valid, the message is next sent to message unwrapping module 260 at 540. The message unwrapping module inspects the header/envelope of the message forwarded from a customer's Exchange mailbox and reindexes so as to provide a user view that is consistent with the way the message would have appeared in the intended recipient's e-mail box on the customer's Exchange server/mailbox.

Figure 6:
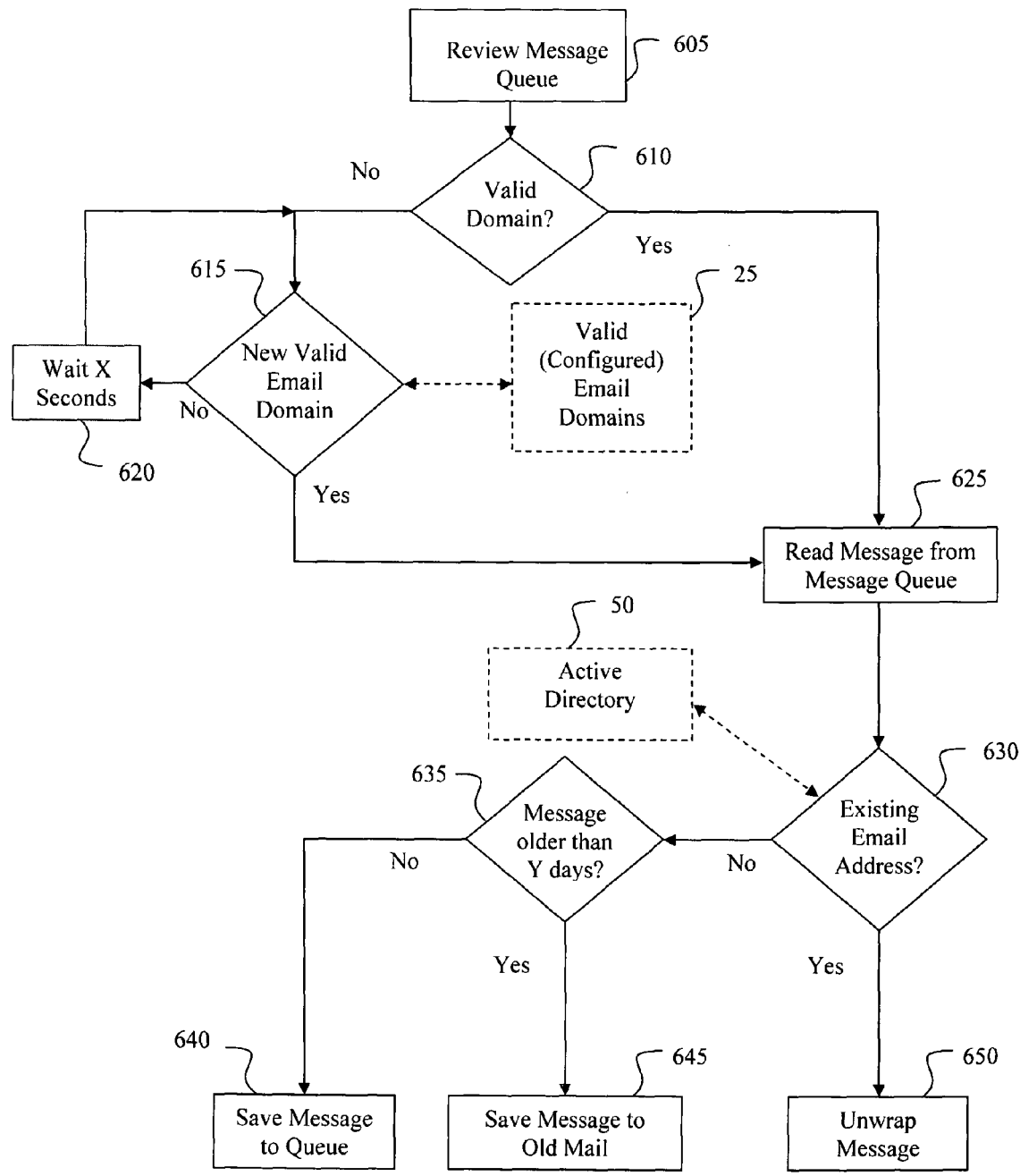
FIG. 6 illustrates a message reviewing process according to exemplary embodiments.

FIG. 6 illustrates process 600 corresponding to the functioning of message reviewing module 240 of FIG. 3. The messages in message queuing module 230 are reviewed at 605. The domain for a message from the message queuing module 230 is first validated at 610. In contrast to process step 520 in FIG. 5 which applies both when messages are being queued in message queuing module 230 as well as when they are not, the domain validation step 610 of FIG. 6 is only invoked when messages have been queued in Message queuing module 230. If the domain is determined to be not valid, the system tests to see if the database 25 of valid domains has been updated with new valid e-mail domains at 615. If the database has not been updated with new valid domains, the process waits for a predetermined time period ("X" seconds) before checking again to see if the domain is a new valid domain at 620. This process is periodically repeated until a new valid domain is determined. The e-mail queue is periodically culled of stale mail at step 635 as described later in this specification.

If the validation of the message header at 610 results in message corresponding to a valid domain, the message is read from the message queuing module 230. Similarly, if the validation of the message header at 615 results in the domain being a new valid domain, message may be read from the message queuing module 230. E-mail address validation next takes place at 630 (analogous to the e-mail address validation in process step 530 of FIG. 5). If the e-mail address is not found to be valid (as an existing or service-authorized e-mail address), the age of the message is determined at 635 based on a timestamp of the message. If the message timestamp indicates that the message is older than a predetermined period of time (e.g. "Y" days), the message is saved at 645 to an old mail folder in an exemplary embodiment. If the timestamp indicates that the message is not older the Y days, the message is returned to the message queuing module 230. If the email address is validated at 630, the message is next sent to the message unwrapping module 260 at 650.

Figure 7:
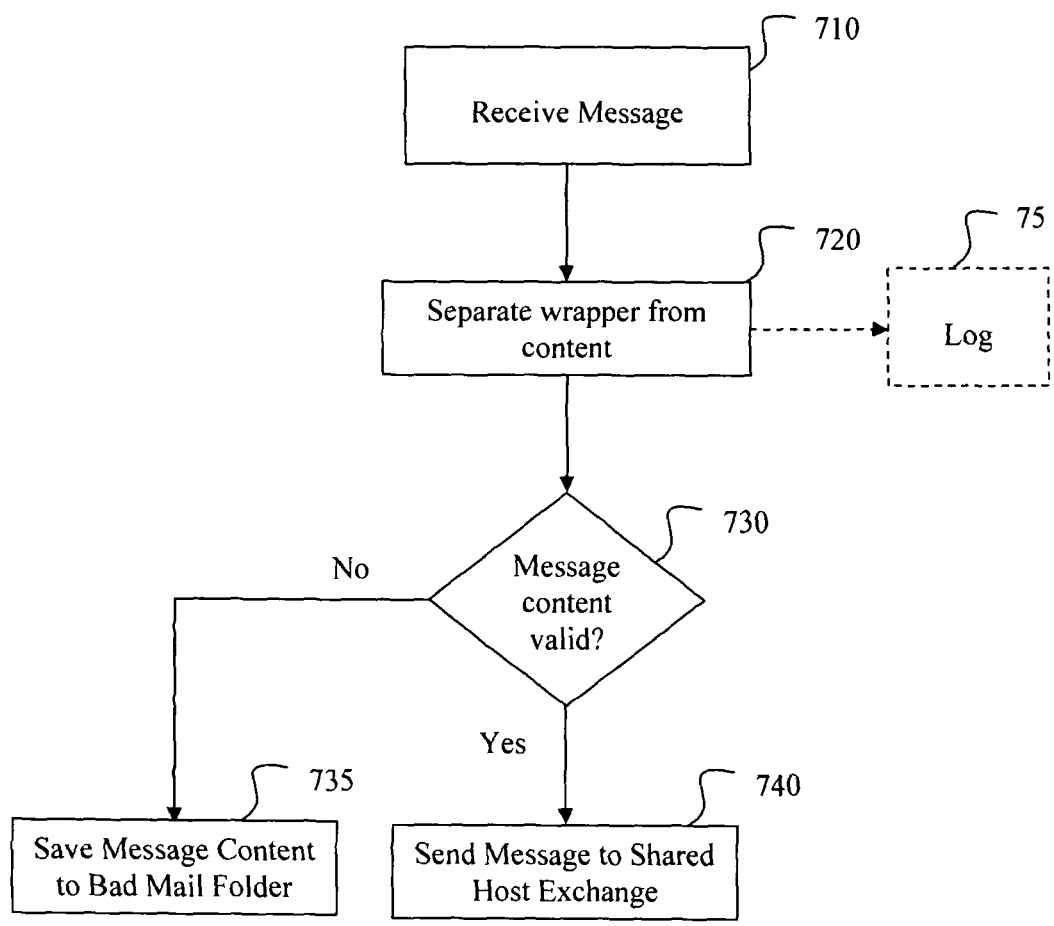
FIG. 7 illustrates a message unwrapping process according to exemplary embodiments.

FIG. 7 illustrates process 700 corresponding to the functioning of message unwrapping module 260 of FIG. 3. A message is received at 710 (from message screening module 220 or message reviewing module 240 of FIG. 3). The message wrapper may be separated from message content at 720. Message wrapper information may be saved to a log 75. The message content is validated at 730. If the message is considered to be invalid (junk e-mail, spam, etc.), the message is sent to a bad mail folder at 735. If the message content is determined to be valid, it is sent to the shared hosted exchange 300 (of FIG. 3) at 740. As noted earlier, the message unwrapping module inspects the header/envelope of the message forwarded from a customer's Exchange mailbox and removes the outermost envelope of the message, and thus effectively reindexes the message so as to provide a user view that is consistent with the way the message would have appeared in the intended recipient's e-mail box on the customer's Exchange server/mailbox.

Exemplary embodiments as described leverage features of Exchange for creating a copy of every e-mail at an off site location. This obviates the need for installation of third party software or proprietary storage hardware on Exchange server for purposes of replication. A cost effective and reliable solution for continuity of Exchange implementations may be provided. The system and methods as described may also be utilized during non-emergency situations such as during upgrade and maintenance periods for example.

In some embodiments, the messages copies off site may also be maintained for regulatory or compliances purposes. Furthermore, these messages may be filtered for junk, spam, phishing, etc. E-mail messages as described above may be referred to as electronic communications. While the description above refers to Exchange server, it may be applicable similarly to other types of servers.

Although, a particular exemplary embodiment of the invention has been disclosed in detail for illustrative purposes, it will be recognized to those skilled in the art that numerous variations or modifications of the disclosed invention, including the rearrangement in the configuration of the secured e-mail system of the present invention as well as its method of use being amenable to modifications on account of an organization's/customer's need, are possible.

What is claimed is:

1. A computer implemented method of ensuring delivery of electronic messages during periods of business disruption from unexpected disasters, the method comprising the steps of:
receiving electronic messages from a plurality of sources; and
processing each of the received messages for delivery to intended addressees, wherein the processing comprises:
validating a domain of a sender of a received message by comparing the domain with a pre-stored list of domains;
verifying an address of an intended addressee; and
determining at least one of the validation and verification is not satisfied and storing the received message in a message queue for further processing, wherein said further processing comprises:
monitoring updates to the pre-stored domain list;
subjecting the sender domain of a message in the queue to a further validation process at a pre-determined frequency by comparing the sender domain with the updated domain list if an age of the message does not exceed a specified time threshold; and
discarding the message from the message queue if the age of the message exceeds the specified time threshold.

2. The method of claim 1, further comprising:
delivering the message to the intended recipient if both the validation and the verification are satisfied.

3. The method of claim 1, wherein said verification of the address of the intended addressee further comprises:
determining whether the intended addressee of the received message is authorized to receives messages during business disruption by comparing an address of the intended addressee with a pre-stored list of addresses.

4. The method of claim 1, further comprising:
verifying the address of the intended addressee; and
if the address is verified, delivering the message to the intended addressee;
if the address is not verified:
determining an age of the received message;
returning the message to the message queue if the age of the received message does not exceed the specified time threshold; and
discarding the message if the age of the received message exceeds the specified time threshold.

5. The method of claim 1, wherein discarding of the message comprises storing the message in an old mail folder.

6. The method of claim 1, wherein said plurality of sources comprise SMTP servers.

7. The method of claim 6, wherein the SMTP servers are accessible over a public network.

8. The method of claim 7, wherein the public network is the internet.

9. The method of claim 1, wherein said plurality of sources comprise trusted sources.

10. The method of claim 9, wherein said trusted sources are accessible via a private network.

11. The method of claim 10, wherein said trusted sources are accessible via a secure connection.

12. A computer implemented method of ensuring delivery of electronic messages during periods of business disruption from unexpected disasters, the method comprising the steps of:
receiving electronic messages from a plurality of sources; and
processing each of the received messages for delivery to intended addressees, wherein the processing comprises:
validating a domain of a sender of a received message by comparing the domain with a pre-stored list of domains;
if the validation is not satisfied, storing the received message in a message queue for further processing;
if the validation is satisfied, verifying an address of an intended addressee of the received message by determining whether the intended addressee is authorized to receive messages during a period of business disruption;

if the address is not verified, storing the received message in the message queue for further processing;

if the address is verified, delivering the message to the intended recipient;

wherein said further processing comprises:

determining whether the age of a message in the queue exceeds a specified time threshold;

if the age exceeds the specified time threshold, discarding the message from the message queue;

if the age does not exceed the specified time threshold:

subjecting the sender domain of a message in the queue to a further validation process at a predetermined frequency by comparing the sender domain with an updated domain list;

subjecting the address of the intended addressee of the message in the queue to a further verification process upon satisfaction of the further validation process; and delivering the message to the intended recipient upon satisfaction of the further verification process.

\* \* \* \* \*